July 22, 1952 W. BUCHAL ET AL 2,604,281
ACTUATING MECHANISM AND SUPPORT FOR BOMB BAY DOORS
Filed Aug. 11, 1948 7 Sheets-Sheet 3
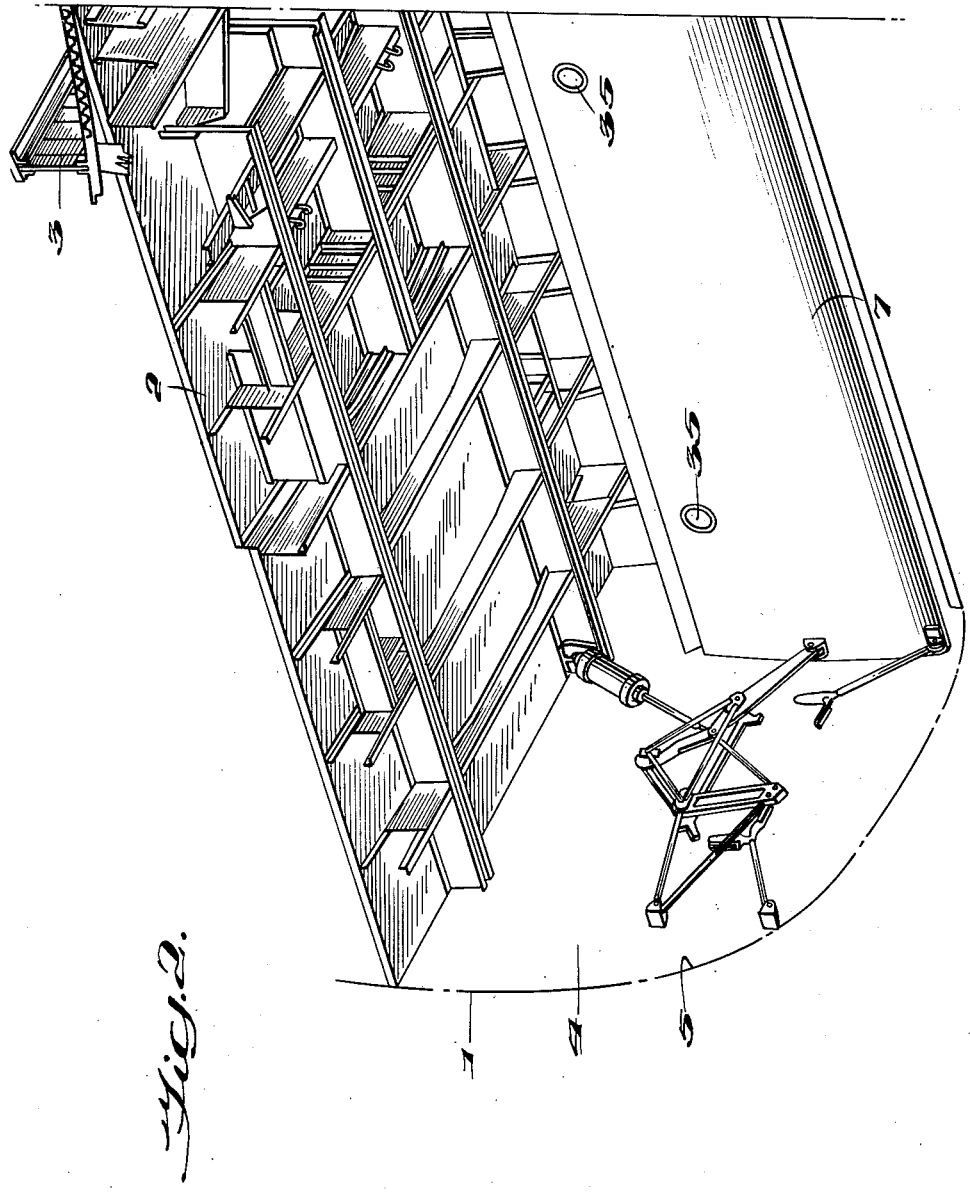
Inventors
WERNER BUCHAL,
CONRAD H. COOKE,
By Donald W. Farrington
Attorney July 22, 1952 W. BUCHAL ET AL 2,604,281
ACTUATING MECHANISM AND SUPPORT FOR BOMB BAY DOORS
Filed Aug. 11, 1948 7 Sheets-Sheet 4

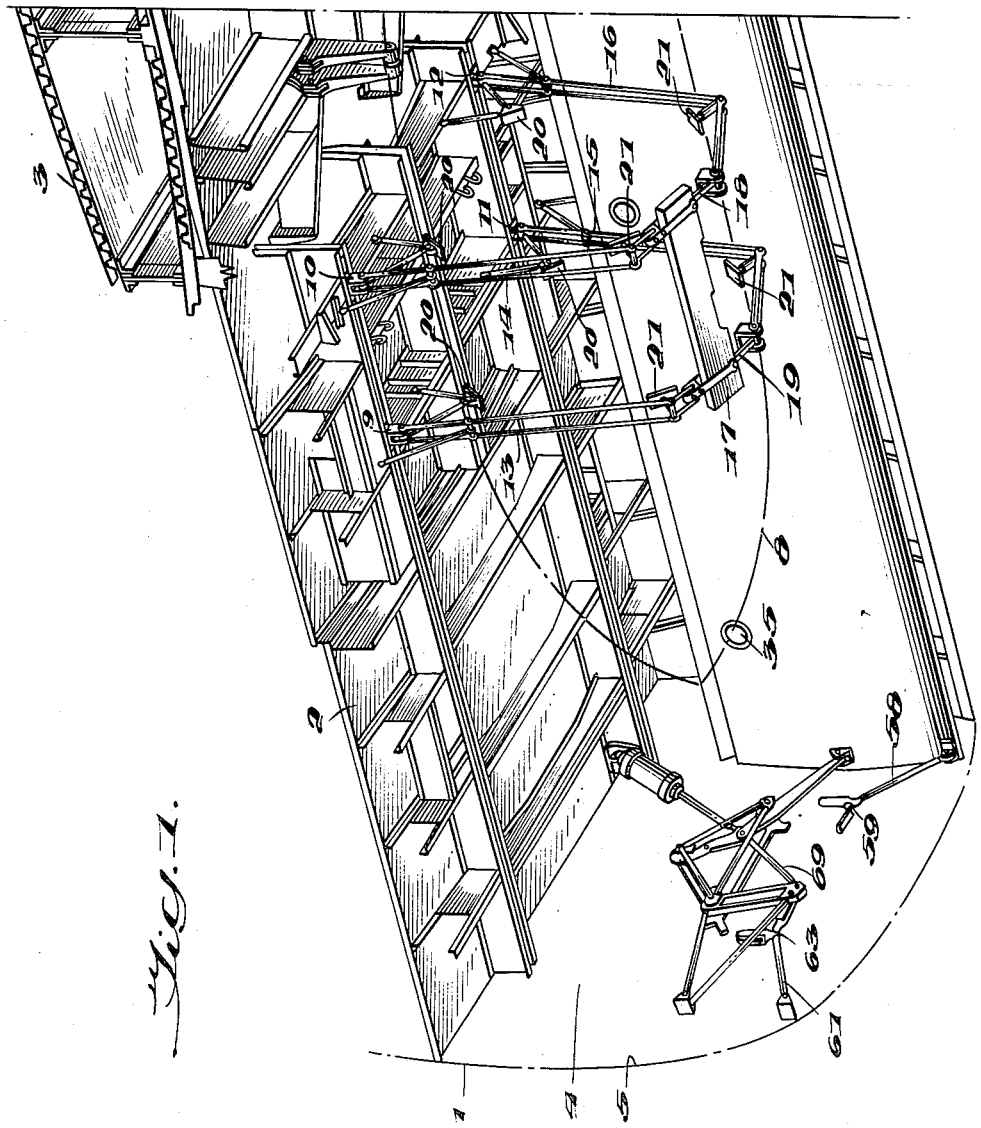

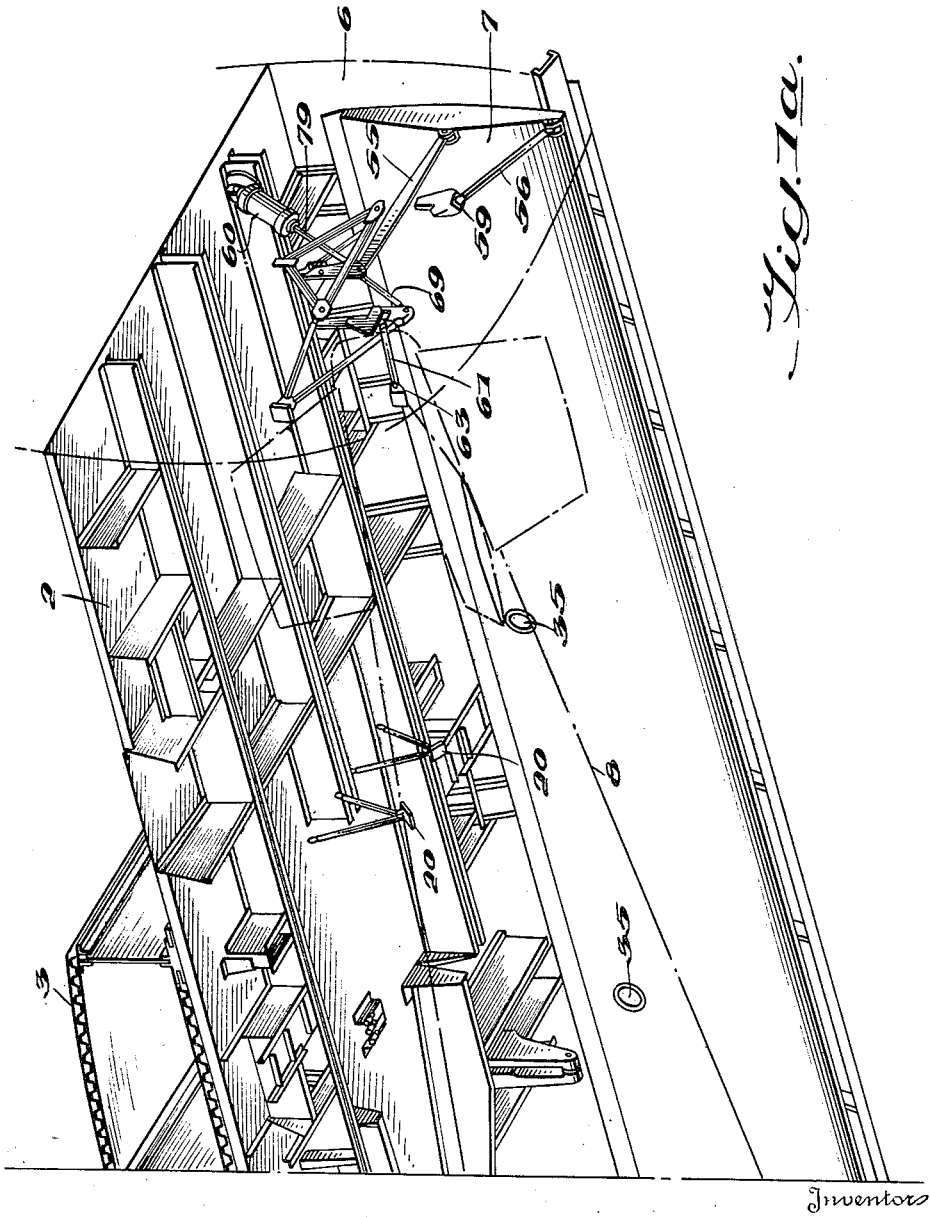

Inventors
WERNER BUCHAL,
CONRAD H. COOKE,
By Donald W. Farrington
Attorney

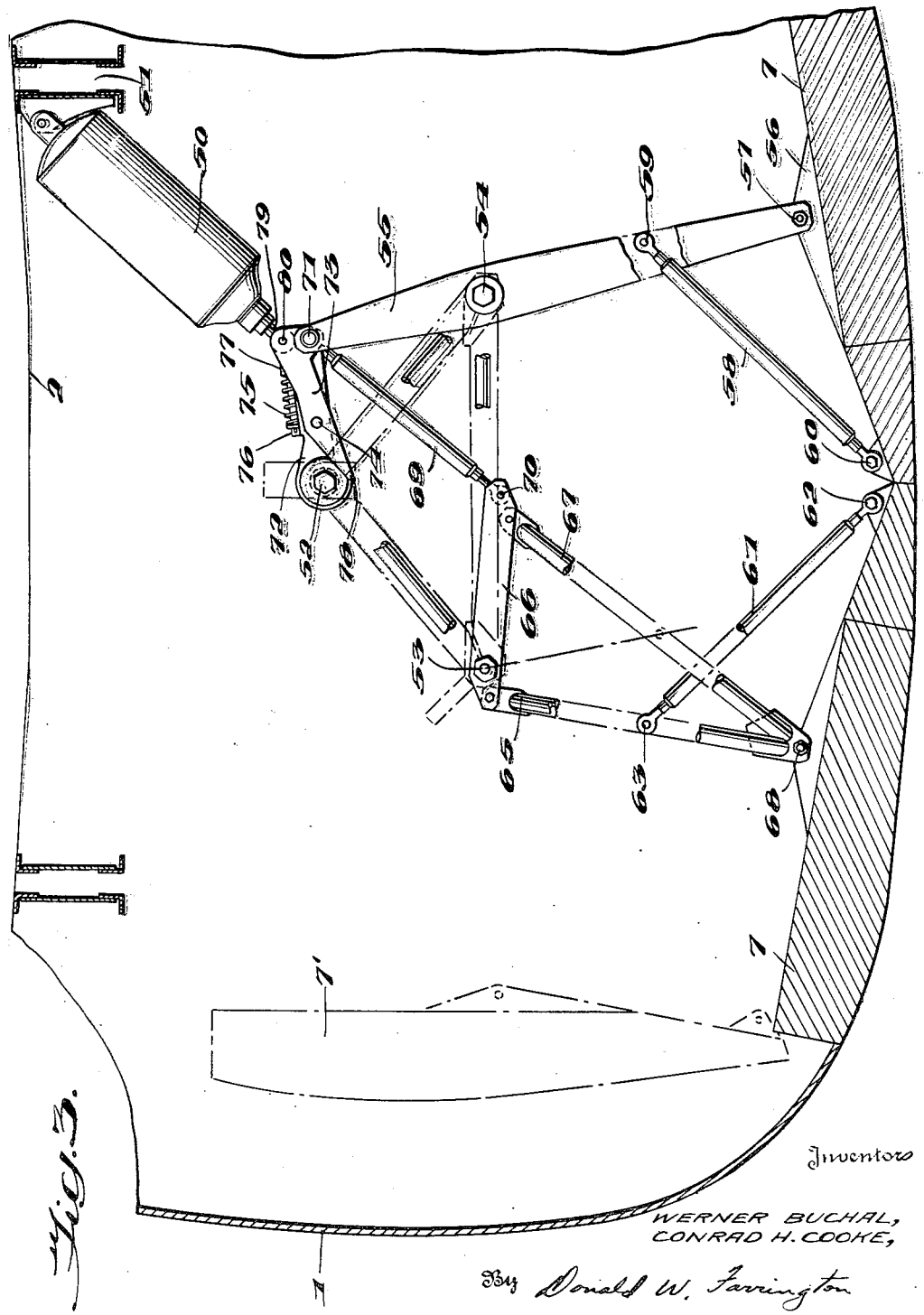

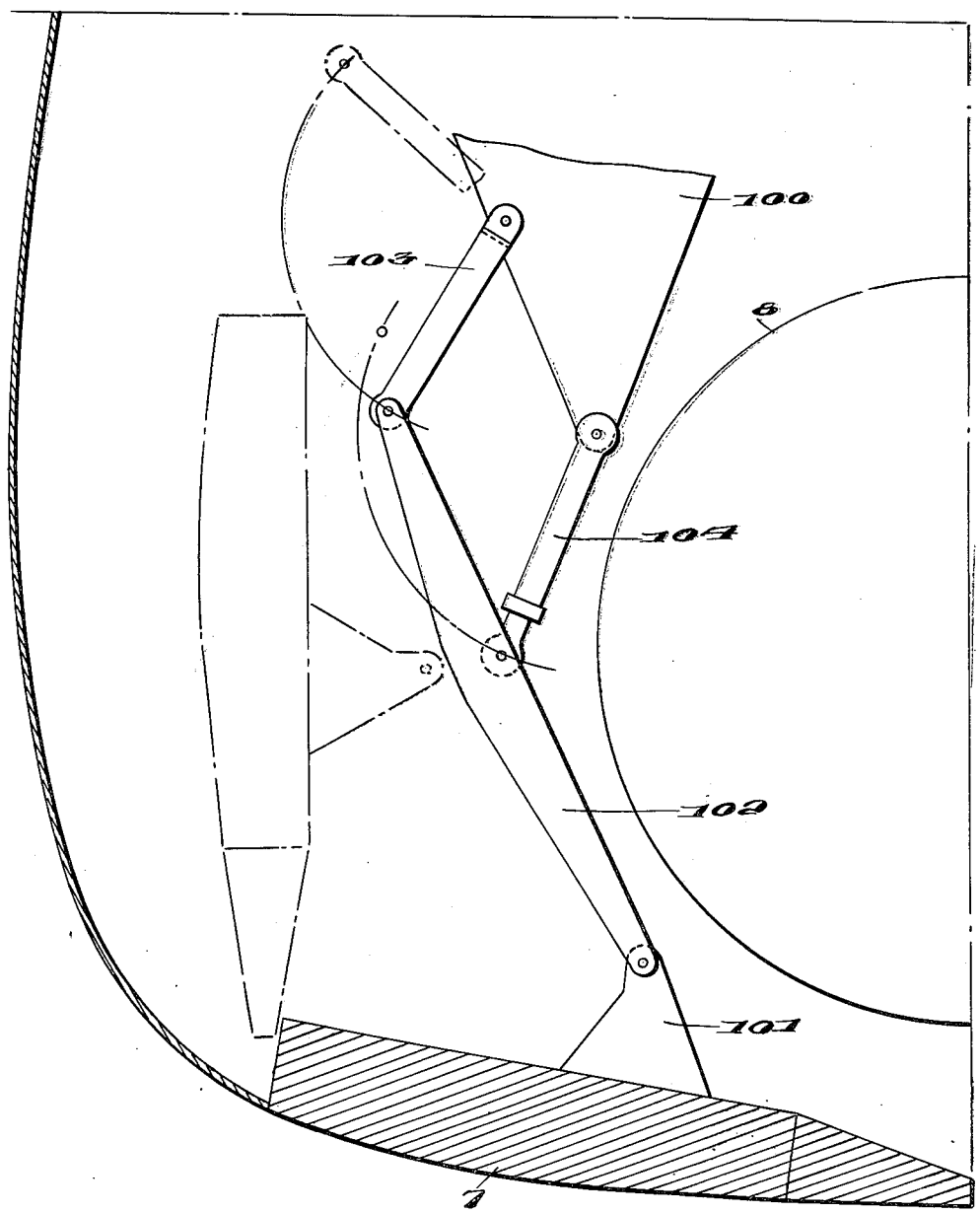

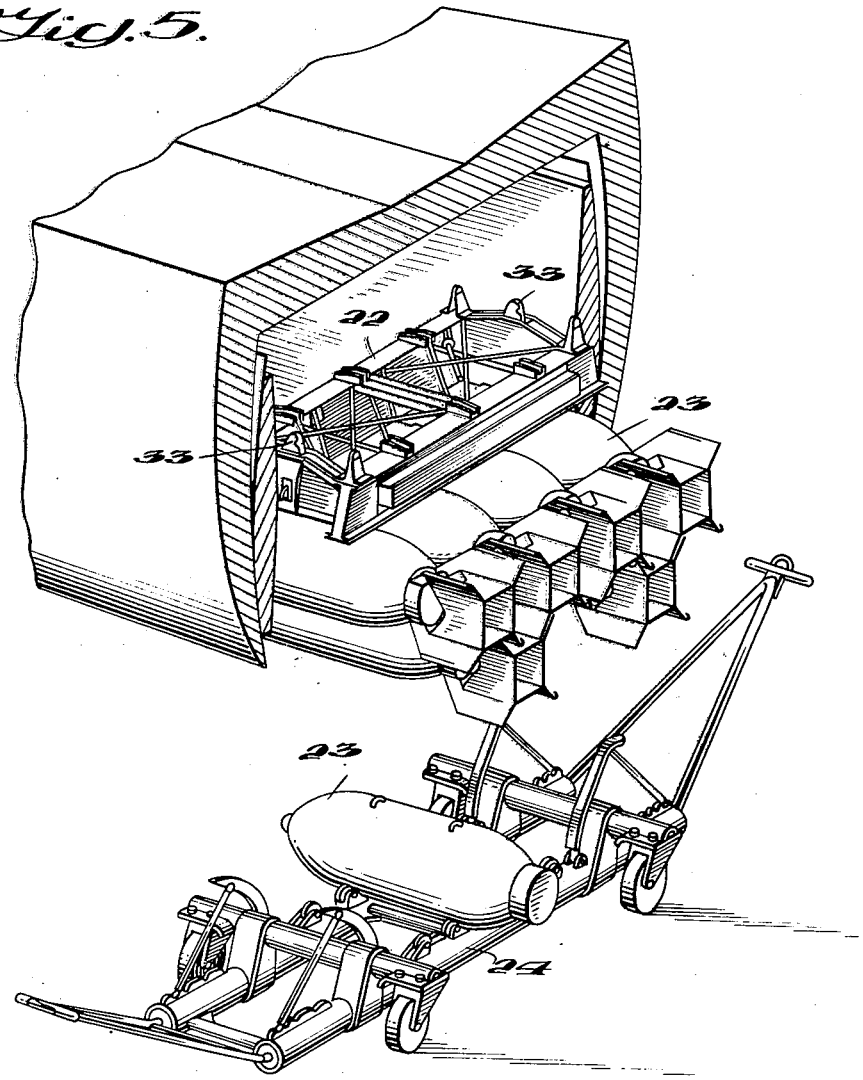

Patented July 22, 1952

2,604,281

UNITED STATES PATENT OFFICE 2,604,281

ACTUATING MECHANISM AND SUPPORT FOR BOMB BAY DOORS

Werner Buchal, Bel Air, and Conrad H. Cooke, Middle River, Md., assignors to The Glenn L. Martin Company, Middle River, Md., a corporation of Maryland Application August 11, 1948, Serial No. 43,704

4 Claims. (Cl. 244—129)

This invention relates to a novel airplane fuselage structure, but more particularly to the bomb bay and bomb loading arrangement of the bomb bay. Bomber airplanes heretofore have had bomb bays extending substantially the depth of the fuselage with vertical rails mounted in the fuselage to which the bomb shackles were secured. The bombs were then supported by the bomb shackles to be released singly or in groups. The arrangement of the bombs was limited to a vertical pile. In the larger bombers, bomb bays were divided in two halves; bomb rails and bomb shackles symmetrically arranged at the center of the fuselage so that vertical rows of bombs were suspended on each side of the central plane of the fuselage. When small bombs were loaded, each bomb shackle supported a bomb. When larger bombs were employed, some bomb shackles were skipped, and as many bombs as could be accommodated on the vertical rails were secured to the corresponding bomb shackles, the number was dependent on the size. While this vertical arrangement in the bomb bay permitted some flexibility in the numbers and size of bombs that could be carried, the structural limitations precluded carrying one or two bombs, about equal in size to the bomb-carrying capacity of the airplane.

In all of the previous bombers, the bomb bay doors have caused considerable difficulty. All of them open outwardly and offer considerable drag at a crucial time in the bomb run. Furthermore, the opening of the bomb bay doors has been in some instances a signal that the plane is on a bomb run, and it is at this time that the fighters come in from the sides for attack. For these reasons, it has been highly desirable to eliminate the drag and the signal afforded by the doors, as has been accomplished by this invention.

By this invention, an arrangement of bomb bay and bomb load is afforded that overcomes two of the principal difficulties of the vertical arrangement of bomb rack and bomb shackles. A horizontal arrangement of bomb bay load is permitted which is much more versatile in that it can accommodate all types of load from large clusters of small bombs to a single large bomb substantially filling the bomb bay, and the bomb arrangement in the horizontal bomb bay greatly facilitates the loading inasmuch as the bomb racks can be preloaded before being hoisted into place in the bomb bay. Since much of the loading of the bombs is done under adverse conditions of light, both within the bomb bay and at night, a simplified loading arrangement is provided, as well as the placing of lights in the doors where they will illuminate the portion of the bomb bay where attachments and connections must be made.

It is an object of this invention to provide an elongated horizontal bomb bay adapted to accommodate a variety of types of load from large clusters of small bombs to a single bomb, all to be loaded with equal facility.

It is another object of this invention to provide elongated bomb bay doors that may be wholly retracted within the fuselage to provide a maximum bomb dropping area with minimum interference with the bomb load.

It is another object of this invention to provide end linkage suspensions for the bomb bay doors that will lock the bomb bay doors independent of the actuating mechanism in either the open or closed position.

It is another object of this invention to provide a center support linkage for the doors that will guide the center portion of the door from the closed to the open position with a minimum of interference with the bomb load.

It is another object of this invention to provide horizontal bomb racks and bomb shackles for loading bomb clusters in the bomb bay.

It is a further object of this invention to provide a linkage arrangement of slings including a single bomb shackle for the suspension and release of a single large bomb.

Other objects of this invention will become apparent from the following description when taken in conjunction with the accompanying drawings in which like members refer to like parts in different views.

In the drawings:

Figures 1 and 1A show a view looking up in under the fuselage into the bomb bay.

Figures 2 and 2A show a view similar to 1 and and 1A illustrating a different type of bomb load arrangement.

Figure 3 shows the door actuating and locking mechanism.

Figure 4 shows the center support of the door.

Figure 5 shows the loading of the bomb racks and bomb bay.

Figure 2A:
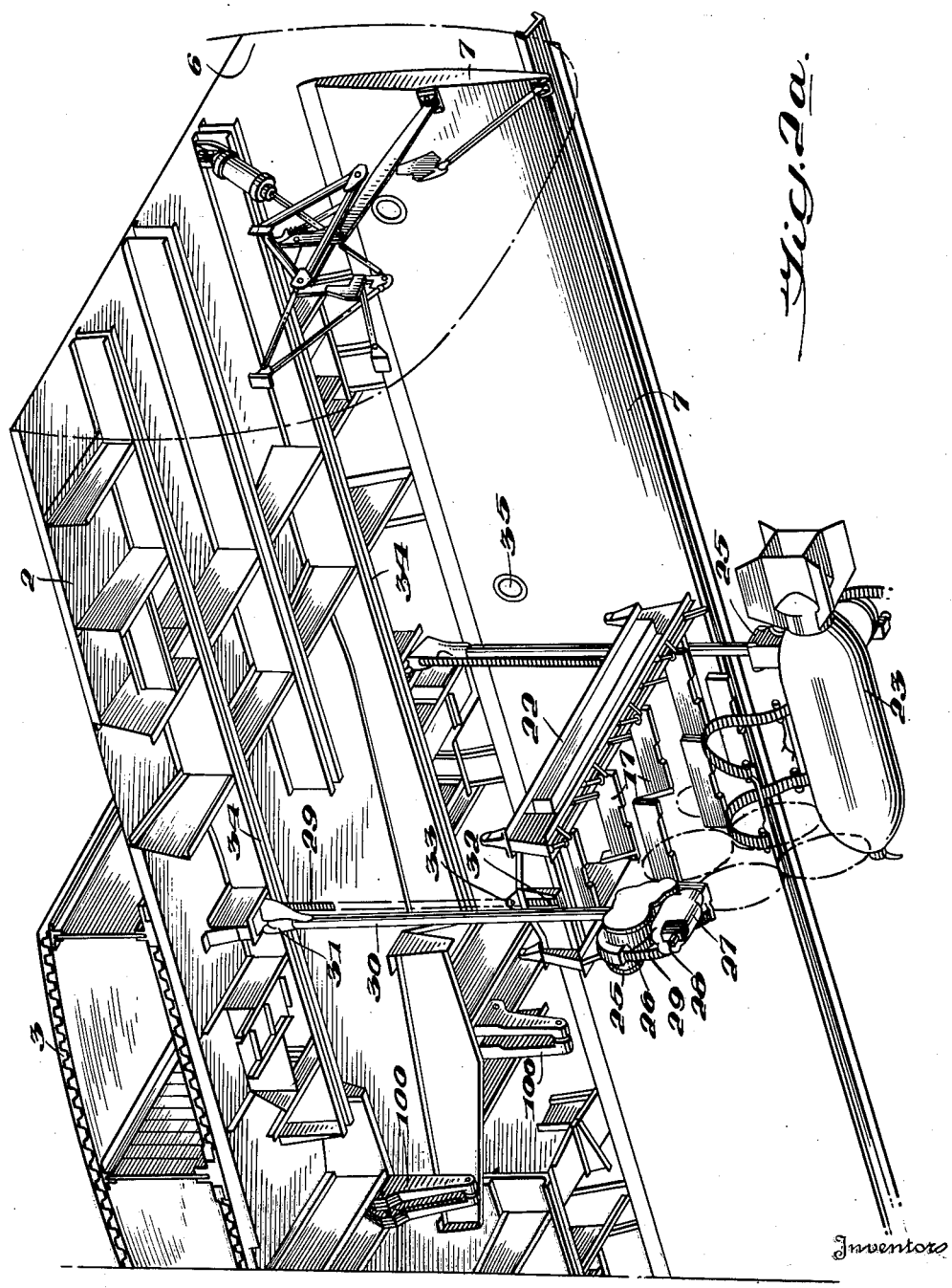

The drawings illustrate the invention and show an airplane having a horizontal bomb bay employing horizontal bomb racks as distinguished from the conventional vertical bomb bays with vertical bomb racks. In the conventional type airplane, the bomb bays extend the depth of the fuselage. The bomb racks or bomb rails are mounted vertically in the fuselage, and bomb shackles secure the bombs to the bomb rails in a vertical arrangement for dropping in sequence or altogether. Due to the depth of the fuselage, with the vertical arrangement of the bomb rails, it is very difficult to load the bombs into the airplane, particularly at night at airports where, for security reasons, only very small amounts of light may be employed. The horizontal bomb bay of this invention consists of a floor that divides the fuselage so that the bomb bay is formed by the substantially flat upper transverse partition and the lower portion of the fuselage. A pair of long, single doors are provided, the pair being substantially equal to the width of the fuselage so that a maximum area of doorway will be available, opening downwardly. This type of bomb bay can accommodate a great variety of types of bomb load. It can accommodate several transverse, horizontal bomb racks supporting bomb clusters, the number depending upon the size of the bombs, or it can support a single large bomb substantially filling the bomb bay.

In Figures 1 and 1A of the drawings, the outline of the fuselage is shown at 1. Partition 2 in the fuselage forms the top of the bomb bay and extends transversely of the fuselage. Structure 3 is a portion of the wing structure extending through the fuselage. Bomb bay 4 is included between bulkheads 5 and 6. Doors 7 operate in pairs and form a long, continuous closure for the opening in the bottom of the bomb bay. The mechanism shown attached to bulkheads 5 and 6 and doors 7 will be described in detail subsequently.

In these figures, a large, single bomb 8 is shown suspended in the bomb bay. The suspension consists of four articulated linkages 13 to 16 secured to the frame work forming the top of the bomb bay by brackets 9, 10, 11 and 12. Linkages 13, 14, 15 and 16 comprise several members hinged together; the number of members is dependent upon the circumference of the bomb that they must encircle. The ends of linkages 13 and 14 are secured to the bomb shackle 17. The ends of linkages 15 and 16 have terminal fittings 18 and 19 that are secured to the bomb hooks of the bomb shackle. Adjustable bomb chocks 20 engage the periphery of the bomb and prevent swaying of the bomb in the suspension under side loads. Other bomb chocks 21 secured at the hinge point of the articulated linkages 13 to 16 hold the bomb firmly in the suspension. It should be noted that linkages 13 and 15 are forward of the center of gravity of the bomb and linkages 14 and 16 are aft of the center of gravity of the bomb. To release the bomb, bomb shackle 17 is actuated in the usual manner releasing fittings 18 and 19, thereby disconnecting the suspending linkages so that the bomb is free to fall from the bomb bay.

The loading of the bomb bay with clusters of bombs is shown in Figures 2, 2A and 5. The horizontal bomb rack consists of a frame 22 from which are suspended bomb shackles 17.

The number and arrangement of such bomb shackles are dependent upon the size of the bombs and the number in the cluster. Bombs 23 are stacked on an especially designed cart or carriage 24 so that the bomb shackles 17 may easily and conveniently be attached and the cluster of bombs secured to bomb rack 22. Cart 24, with the bomb cluster ready for hoisting into the bomb bay, is moved into position under the bomb bay. Bomb rack 22 is elevated into position in the bomb bay by a pair of portable bomb hoists 25. These bomb hoists consist of a gear box 26 driven by motor 27 controlled by push button 28. Chain 29 is fed through the gear box 26 and through pipe 30. A fitting 31 on the top of pipe 30 detachably secures the bomb hoist to the structure at the top of the bomb bay. Chain 29 passes over a sprocket in fitting 31 and is secured to the end of the bomb rack at 32. Latches 33 automatically engage rails 34 when hoisted to the top of the bomb bay which secures the horizontal bomb rack in place. The bomb hoists can then readily be disconnected from the bomb rack and the top of the bomb bay and removed for subsequent use. The bomb shackles can be operated in any predetermined sequence to release the bombs from the cluster separately or as a group.

The door actuating mechanism, shown in Figure 3, is the same on each end of the door adjacent bulkheads 5 and 6. Hydraulic cylinder 50 is secured at its upper end to the stringer structure 51 supporting partition 2. Doors 7 form a closure for the opening in the bottom of the bomb bay and are moved by a quick-acting linkage assembly to the position shown at 7' wherein the doors are substantially vertical and close to the inside walls of the bomb bay so that a maximum space will be afforded for the bomb load. The main pivot 52 is secured to the bulkhead and forms the support for the several linkages shown. Bell-crank linkage pivot 53 is also fixed with respect to the bulkhead as is master link pivot 54. Master link 55 is pivoted at 57 at its lower end to a bracket 56 secured to door 7. Link 58 is pivoted at one end 59 to bulkhead 5 and at the other end 60 to the inner edge of the door. Linkage 58, therefore, determines the arc of motion of the inner edge of the door. Linkage 61 is secured to the other door and is pivoted at 62 and 63 in a similar fashion. Members 65, 66 and 67 form a bell-crank lever which is pivoted at 68 to the door. An interconnecting lever 69 is pivoted to the bell-crank lever at 70 and pivoted to the upper end of master link 55 at 71. From the linkages described, it can be seen that as the upper end of master link 55 is moved counterclockwise about fixed pivot 54 the right hand door will move from a horizontal to a vertical position swinging on linkages 58 and 55 about pivot points 59 and 54. As the upper end of master link 55 is moved, interconnecting link 69 moves the bell-crank linkages 65, 66 and 67, so that the left hand door is moved from a generally horizontal position to a vertical position swinging on the bell-crank linkage and linkage 61 pivoted about points 53 and 63.

A two-part linkage extends between pivot points 52 and 71. This linkage consists of portions 72 and 73. Portions 72 and 73 are pivoted at their ends at points 52 and 71 and intermediate the ends at pivot 74. It will be noted that pivots 52, 74 and 71 are in a straight line. A spring 75 acts between an abutment 76 on member 72 and an abutment 77 on member 73, tending to keep pivots 52, 74 and 71 in the same straight line. End portion 78 of lever 73 abuts against the side of lever 72 when the three pivot points mentioned above are aligned. Strut 79 from hydraulic cylinder 50 is pivoted on member 73 at 80. It will be noted that upon motion of strut 79, pivot point 80 is out of line with 71 and exerts a force to overcome spring 75 and cause pivot point 74 to go out of alignment with pivots 52 and 71 and move the upper end of master link 55 to actuate the linkage mechanism to open the doors. Spring 75 can normally exert sufficient force to cause the compound link 72—73 to maintain its three pivot points in alignment and, therefore, forms an adequate lock for the door actuating mechanism that can only be unlocked when cylinder 50 exerts a force to overcome the spring. When the doors are moved to the open position, compound linkage 72—73 is moved to a substantially vertical position with the cylinder strut extended and the spring 75 again aligns the three pivot points 52, 74 and 71 of the compound linkage 72—73 to form a lock for the door actuating linkage mechanism. In the open position, linkage 72—73 can only be broken to unlock by the retraction of strut 79 into cylinder 50.

Because of the extreme length of the bomb bay door, it is necessary to have a center support that will support the door in the open and closed positions but that will not interfere with the maximum size bomb that may be carried in the bomb bay. Such a support is shown in Figure 4. Bracket 100 is secured to the top of the bomb bay and depends therefrom. It is located sufficiently to the side of the centerline of the bomb bay so that it will not interefere with the maximum size bomb 8 that may be carried therein. Door 7 has a bracket at mid length 101 secured thereto. A master link 102 is pivoted to bracket 101 and to the ends of linkages 103 and 104 which are in turn secured to bracket 100. Linkages 102, 103 and 104 and bracket 100 form a parallelogram designed to give the proper motion of the door from the closed to the open position that will also cause minimum interference with the load area of the bomb bay.

Lights 35 are mounted in doors 7 so that the upper portion of the bomb bay where connections for the bomb shackles, etc., must be made are illuminated from within the airplane. This greatly facilitates loading the bomb bay with the right amount of light where it is needed.

It is to be understood that certain changes, alterations, modifications and substitutions can be made without departing from the spirit and scope of the appended claims.

We claim as our invention:

1. An airplane fuselage having a bomb bay formed therein, a pair of doors forming a faired closure for said bomb bay extending longitudinally of said bomb bay, both longitudinal edges of each said doors being free to move with respect to the bomb bay from the closed to the open position, linkage means secured at spaced points along said bomb bay and said doors to move said doors from a generally horizontal, closed position, with their inner edges abutting, to a generally vertical position within said bomb bay contiguous the inner walls thereof to afford a maximum of clear bomb dropping space, with a minimum of aerodynamic drag on a bomb run, said linkage means comprising a pair of rigid links associated with each door and pivoted directly to said fuselage and to said door at spaced points adjacent the end thereof, the pivots for one of said links being so located that the inner edge of said door is caused to initially swing downwardly so as to rock said door about the pivotal connection of the other link to the door whereby to swing the outer edge of the door upwardly and inwardly of said fuselage to clear the wall thereof.

2. An airplane fuselage having a bomb bay formed therein, a pair of doors forming a faired closure therefor extending longitudinally of said bomb bay, both longitudinal edges of each said doors being free to move with respect to the bomb bay from the closed to the open position, linkage means secured at spaced points along said bomb bay and said doors to move said doors from a generally horizontal abutting closed position, to a generally vertical position within said bomb bay contiguous the inner walls thereof to afford a maximum of clear bomb dropping space, with a minimum of areodynamic drag on a bomb run, said linkage means comprising a master link extending from a bracket on one of said doors to one end of a two-part locking lever, the other end of said lever being secured to the bulkhead on the center line of the fuselage, said master lever being pivoted intermediate said ends, a linkage secured to each door on one end adjacent the abutting edges of said doors, the other ends of said linkages being secured to said bulkheads to guide said edge of said door in an arcuate path, a bell-crank lever having the outer end of one arm secured to the second door, the intermediate pivot point of which is secured to the bulkhead, an interconnecting link interposed between the upper end pivot of the master lever and the other arm of the bell-crank, spring means to maintain said two-part linkage aligned to maintain the upper end of the master lever a fixed distance from the pivotal support of the other end thereof on the bulkhead, for both open and closed positions of the doors to hold said positions of the doors independent of the actuating mechanism, a hydraulic cylinder having a strut secured to one end of the two-part link adjacent said master control lever pivot, said pivotal connection of the hydraulic strut being off-set from the pivotal connection of the upper end of said master control lever on said two-part link to afford a torque in said two-part link to break and unlock said link so that the strut of the hydraulic cylinder may move the master control lever and the bell-crank lever through the interconnecting link to move the doors from the closed to the open position.

3. An airplane fuselage having a bomb bay formed therein, a pair of doors forming a faired closure therefor extending longitudinally of said bomb bay, both longitudinal edges of each said doors being free to move with respect to the bomb bay from the closed to the open position, linkage means secured at spaced points along said bomb bay and said doors to move said doors from a generally horizontal abutting closed position, to a generally vertical position within said bomb bay contiguous the inner walls thereof to afford a maximum of clear bomb dropping space, with a minimum of aerodynamic drag on a bomb run, said linkage means comprising power-actuated linkages at the ends of said doors adjacent the bulkhead and a door center supporting linkage consisting of members depending from the top of said bomb bay, one over each door spaced laterally from the center of the bomb bay to clear the largest bomb that can be therein accommodated, a master link secured on one end to the center portion of said door, the other end of said master link being connected at two spaced points by two links to two generally similar spaced points on said depending member forming a quadrilateral upper linkage, spacings of the pivot points on said quadrilateral linkage being of such dimension and arranged to cause the center portion of the door to follow the path of the ends of the door upon said ends being moved by said power-actuated linkage.

4. An airplane fuselage having a horizontal transverse partition therein dividing said fuselage into upper and lower compartments, said lower compartment forming a bomb bay of greater transverse width than depth, a pair of elongated doors forming a faired closure therefor extending longitudinally of said bomb bay, both said longitudinal edges of each door being free to move with respect to the bomb bay from the closed to the open position, linkage means secured at spaced points along said bomb bay to said doors to move said doors from a generally horizontal closed position with their inner edges abutting, to a generally vertical open position within said bomb bay contiguous the inner walls thereof to afford a maximum of clear bomb dropping area with a minimum of aerodynamic drag on a bomb run, said linkage means comprising a first rigid link pivoted directly to each door adjacent the central portion of the end thereof and a second rigid link pivoted directly to each door adjacent the inner edge thereof, said links being directly pivoted to said fuselage at vertically spaced locations generally above the central portion of the end of the associated doors when the doors are in closed position whereby upon initial swinging of said links from their door-closed positions relative to the fuselage, said second links will cause said doors to rock about their pivotal connection with the first links whereby to cause the outer edges of the doors to swing upwardly and inwardly of said fuselage to clear the wall thereof, and means for so swinging said links.

WERNER BUCHAL.
CONRAD H. COOKE.

REFERENCES CITED

The following references are of record in the file of this patent:

UNITED STATES PATENTS

| Number | Name | Date |
|---|---|---|
| 2,309,686 | Winters | Feb. 20, 1943 |
| 2,338,030 | Edgemond | Dec. 28, 1943 |
| 2,370,307 | Hall | Feb. 27, 1945 |
| 2,412,729 | Hall | Dec. 17, 1946 |
| 2,457,625 | Amiot | Dec. 28, 1948 |

FOREIGN PATENTS

| Number | Country | Date |
|---|---|---|
| 861,598 | France | Nov. 4, 1940 |
| 603,203 | Great Britain | June 10, 1948 |